July 7, 1942.  A. W. ROSS  2,289,072
INFLATING MEANS
Filed Oct. 22, 1941   2 Sheets-Sheet 1
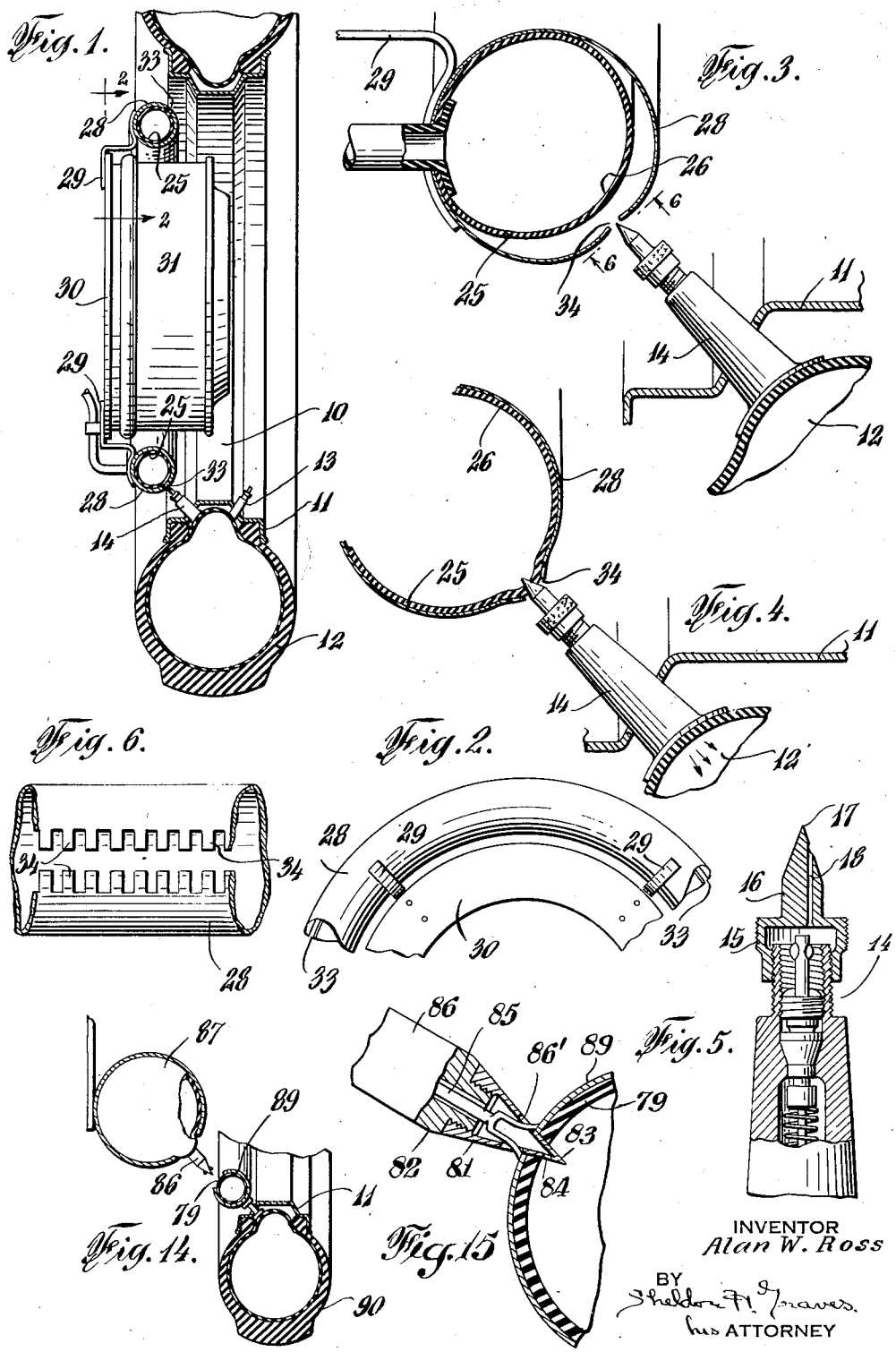
INVENTOR
Alan W. Ross
BY Sheldon H. Graves
his ATTORNEY

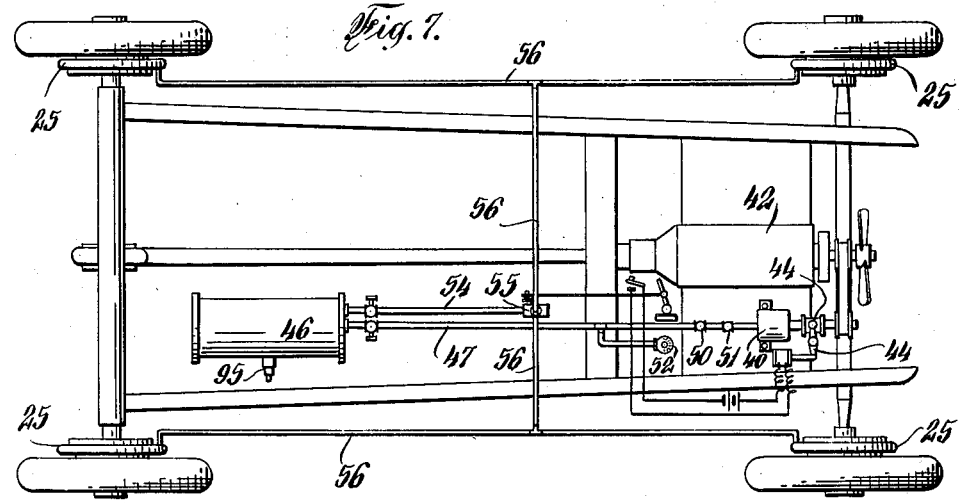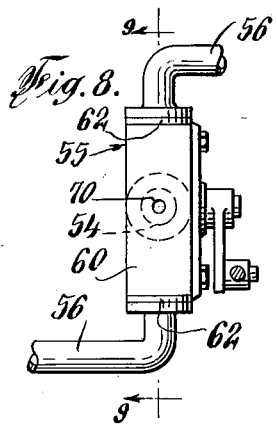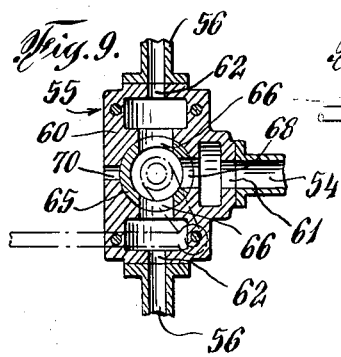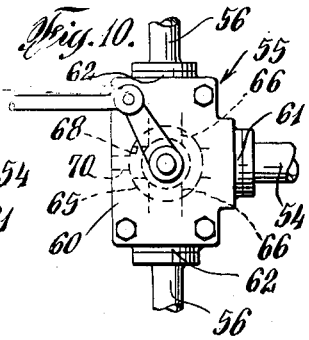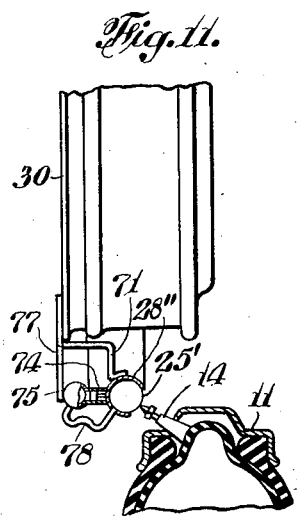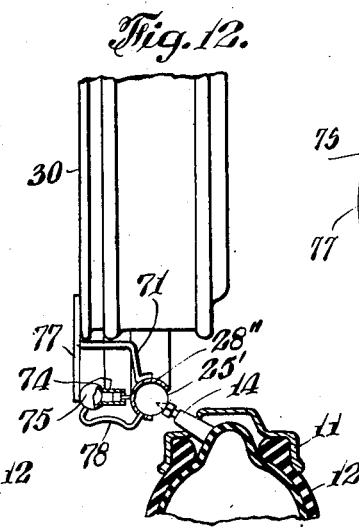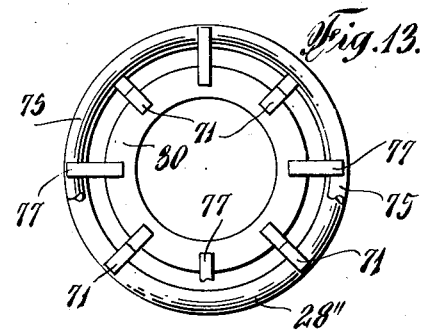

Patented July 7, 1942

2,289,072

UNITED STATES PATENT OFFICE 2,289,072

INFLATING MEANS

Alan W. Ross, Montclair, N. J.

Application October 22, 1941, Serial No. 416,035

3 Claims. (Cl. 152—416)

This invention relates generally to means for introducing fluid under pressure into an enclosure, and more particularly to apparatus for inflating automobile tires, by means carried by the automobile.

In accordance with the preferred form of my invention, I provide a reservoir or source of supply of air on the vehicle, supply-containers for the several tires, connected with the reservoir and devices adapted to pierce or penetrate the walls of the container and thus establish communication between the supply-container and the tire. I also provide means for subsequently removing the penetrating device and for sealing the opening formed by the penetration.

One object of my invention is to provide simplicity of construction as well as ease of manipulation, and a further object is to insure positiveness of operation.

Other objects of my invention will appear from the following description taken in connection with the accompanying drawings, wherein:

Figure 1 is a transverse sectional view, showing an automobile wheel and tire, a tubular air-supply-container formed of flexible material and supported around the brake drum, and a valve device on the tire adapted to penetrate the wall of the container;

Figure 2 is a detailed view, taken on the line 2—2 of Figure 1, and showing the means of supporting the supply container;

Figure 3 is an enlarged transverse sectional view of the flexible supply-container and its support, showing the container deflated and the valve device of the tire removed from the wall of the container, in accordance with one modified form of my invention;

Figure 4 is a view similar to Figure 3, but with the flexible supply-container inflated and the valve device on the tire penetrating the wall of the container;

Figure 5 is a sectional view of the valve device on the tire formed with a point for penetrating the wall of the supply-container;

Figure 6 is a view taken on the line 6—6 of Figure 3;

Figure 7 is a diagrammatic view of an automobile chassis, showing an air pump operated from the motor, an air reservoir, pipes connecting the pump and reservoir and supply-containers, together with suitable valves for controlling the supply of air to the containers;

Figure 8 is a side elevation of a two-way hand-operated valve for controlling the air supply between the reservoir and inflating containers;

Figure 9 is a sectional view taken on the line 9—9 of Figure 8;

Figure 10 is a side elevation of the structure shown in Figure 8, viewed from the right-hand side;

Figure 11 is a diagrammatic view, on a reduced scale, similar to Figure 1, but showing a modified form of the invention and showing the parts, in a position wherein the penetrating valve device is removed from the supply-container;

Figure 12 is a view similar to Figure 11, but showing the parts in such position that the valve device is penetrating the wall of the supply-container;

Figure 13 is a diagrammatic elevation looking from the left of Figures 11 and 12 and showing means supported from the rear plate of the brake drum for holding the air-supply device;

Figure 14 is a diagrammatic view similar to Figure 3 and showing a modification wherein a supply valve device is secured to an inflating container and is adapted to penetrate a second container carried by the wheel of the vehicle; and Figure 15 is an enlarged sectional view of the valve device shown in Figure 14.

Referring to Figure 1, reference character 10, represents an automobile wheel having a rim 11 and tire 12. The tire has the usual valve 13 extending outwardly and an additional valve 14 extending inwardly. Valve 14 may be in all respects the same as the usual valve 13, except that the screw-cap 15 is formed with a central extension 16, tapered at its end to a point 17 and formed with a passage 18 extending longitudinally thereof and spaced a slight distance from the longitudinal axis of the cap, as shown in Figure 5.

The inflating container 25 is preferably in the form of an annular tube of rubber or similar flexible, or resilient, air-tight material. This tube is provided with an inner lining 26, or is otherwise treated, so as to be self-sealing. Container 25 is carried by an annular metal casing 28 of generally tubular form held by bars 29 riveted or otherwise secured to the stationary back plate 30 of the brake drum 31. The casing 28 is formed with a slot or opening 33, the edges of which may be continuous or circular, as shown in Figures 1 and 2, or the casing as shown in Figures 3, 4 and 6 may be serrated or formed with fingers 34.

In the latter form of the invention the metal of which the casing 28 is made is resilient and the fingers 34 press inwardly on the wall of the inflated tube 25 so that when the tube is deflated the wall of the tube is moved away from the valve of the stem 16 as shown in Figure 3. When, however, the supply tube is inflated, the wall of the tube forces the fingers 34 outwardly and the wall is moved into contact with the valve stem, which penetrates the wall, establishing communication between the interior of the inflating tube and the valve 14 and through the valve to the interior of the tire.

In the form of the invention shown in Figures 1 and 2, reliance is had on the resilience of the rubber of the inflating tube to remove the wall of the tube from the valve point. In this form of invention, I preferably cement the inner upper portion of the tube 26 to the casing 28.

In Figure 7, I show means carried by a motor vehicle for inflating the tubes or supply-containers 25. For this purpose, I provide a pump 40, which may conveniently be driven from the fan belt or other motor part of the motor 42, an electromagnetically operated clutch 44, controlled from the dash or automatically by the pressure, being interposed between the fan-belt and the pump.

The outlet of the pump leads to a storage reservoir 46 through a pipe 47, which is provided with check and relief valves 50 and 51, respectively, and a gauge 52 located on the dashboard indicates the pressure in the reservoir. A pipe 54 leads from the reservoir to a hand-operated valve 55, adapted to be operated from the dashboard and through this valve by means of branch pipes 56, communication is established between the reservoir and the supply-containers 25.

Valve 55, which is shown in Figures 8–10 inclusive is designed to be moved to either of two positions, in one of which communication is established from the reservoir through the pipes 54 and 56 to the inflating containers 25 and in the other of which, communication from the reservoir 46 is shut off and the containers 25 through the branch pipes 56 and valve 55 are opened to the atmosphere. In the latter position of the valve, the containers will be deflated as shown in Figure 3.

The valve 55 comprises casing 60 with an inlet port 61 from the reservoir and outlet ports 62, which communicate with the branch pipes 56. The hollow rotary cylinder 65 of the valve is provided with opposite openings 66, which, in Figure 9, are shown to communicate through the outlet ports 62 with the branch pipes 56. The cylinder 65 also has an opening 68, which, in Figure 9, is shown in communication with the port 61. In this figure it will be seen that direct communication is established between the reservoir 46 and the several inflating containers 25. On movement of the valve cylinder 65 through 180 degrees, the opening 68 will be in communication with a small port 70, communicating with the outer air while the inlet port 61 from the reservoir will be closed.

In the forms of the invention shown in Figures 11–13, inclusive, I provide means for moving the supply-containers 25¹ bodily toward and away from the penetrating point of the supply valve. For this purpose, these containers are supported by resilient bars 71, secured to container supports 28'' at one end and at their opposite end to the back face plate of the brake drum as shown in Figure 13. The supporting bars 70 normally hold the supply-containers 25¹ in a position out of contact with the penetrating valves 14 and are adapted to be moved outwardly against the resilient pressure of the bars 70 by means of pistons 74 seated in the wall of an annular auxiliary supply-container 75, which is connected with the branch pipes 56. The containers 75 are supported by rigid bars 77 secured to the back of the face plate of the brake drum and alternate with the resilient supports 70, as shown in the Figure 13. A flexible tube 78 connects the container 75 with the container 25'. It will be seen that upon establishing communication between the reservoir 46 and the auxiliary containers 75, the pistons 74 will be forced outwardly, thus moving containers 25¹ into contact with the puncturing valve 14 and containers 25¹, being supplied with air through the tubes 78 and auxiliary containers 75 will inflate the tire.

In the modification shown in Figures 14 and 15, I apply the penetrating valve to a non-rotating supply container or bulb. This valve is adapted to penetrate the wall of an auxiliary annular rubber container 79 carried by and rotatable with the wheel of the vehicle, which auxiliary container is in direct communication with the tire. Container 79 is preferably carried and protected by a casing 89.

Figure 15 shows one form of valve 86 which I may employ in this form of invention shown. In this valve 86 the screw-cap 80 has an outer conical surface 81, which merges with the outer surface 82 of the valve casing. The cap 80 is tapered to a point 83 and is provided with an opening 84, which communicates with the interior of the cap to provide passage of air from the valve to the interior of container 79.

Valve 86 is normally closed under air pressure in the container 87. The stem 85 of valve 86 is bifurcated at its upper end and the projecting branches or prongs of the valve stem pass snugly through openings 86' in the wall of the valve cap. It will be seen that when the valve shown in Figure 15 is moved toward the auxiliary supply-container 79, and penetrates this container, the flexible wall of container 89 will contact the outer ends of the valve stem branches and move the stem valve inwardly to open the valve and permit the air in the supply-container 87 to flow through the opening 84 into the auxiliary container 79 and thence into the tire or container 90.

If desired, I may provide the reservoir 46 with a valve 95 so that the reservoir may be supplied with air from a source outside the car, such as the usual air supply at service stations.

What I claim as my invention and desire to secure by Letters Patent is:

1. Means for introducing fluid into a container, the combination with said container, a supply-container, one of said containers having a penetrable wall and the other of said containers having means for penetrating said wall, means for moving said wall and penetrating means relatively toward one another to effect penetration of said wall to supply fluid to said first-named container, and means for removing said penetrating means from said wall and closing means for preventing release of fluid from said first-mentioned container.

2. Means for inflating a tire, comprising a valve stem on the tire, a pointed cap for said valve having an opening therethrough adjacent the point, an air supply container having a penetrable wall, means for moving the wall towards the cap point and thus penetrating the wall and forming communication between the interior of said container and said opening, means for removing the wall from said point and means for closing the opening formed by said point.

3. Means for inflating a vehicle tire, a penetrable air supply container connected with said tire, a second air supply container carried by the vehicle, a valve on said second container, adapted to be closed by air pressure therein and formed to puncture said first named container, means to move said valve to puncture said first named container and admit air to the same and means for withdrawing said valve from said first named container and closing the puncture made by said valve.

ALAN W. ROSS.